United States Patent [19]

Moore et al.

[11] Patent Number: 4,708,386

[45] Date of Patent: Nov. 24, 1987

[54] INTEGRATED CONSOLE CUP HOLDER

[75] Inventors: Michael G. Moore, Rochester; Ronald E. Mills, Birmingham, both of Mich.

[73] Assignee: Chrysler Motors Corporation, Highland Park, Mich.

[21] Appl. No.: 859,978

[22] Filed: May 5, 1986

[51] Int. Cl.⁴ .................................................. B60R 7/04
[52] U.S. Cl. .................................... 296/37.8; 296/37.14
[58] Field of Search .................... 296/37.9, 37.8, 37.13, 296/37.12, 37.14; 224/42.42, 273, 311; 108/45; D3/40; 220/23

[56] References Cited

U.S. PATENT DOCUMENTS

| | | | |
|---|---|---|---|
| 3,356,409 | 12/1967 | Belsky et al. | 224/42.42 R |
| 3,606,112 | 9/1971 | Cheshier | 108/45 |
| 3,899,982 | 8/1975 | Fetzek | 108/45 |
| 4,453,759 | 6/1984 | Kathiria | 296/37.8 |

*Primary Examiner*—Robert B. Reeves
*Assistant Examiner*—Carol L. Olson
*Attorney, Agent, or Firm*—Gerald P. Dundas

[57] ABSTRACT

A cup holder for employment within the passenger area of a vehicle. The cup holder is built into a vehicle console structure so as to be incorporated as an integral part of the vehicle's interior and minimize bulk, attachment and support requirements. The cup holder may be formed in a sliding panel on the console with the sliding panel controlling access to an additional cup holder.

1 Claim, 3 Drawing Figures

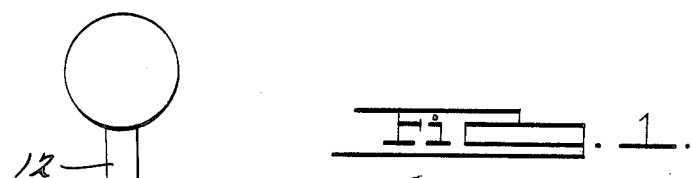
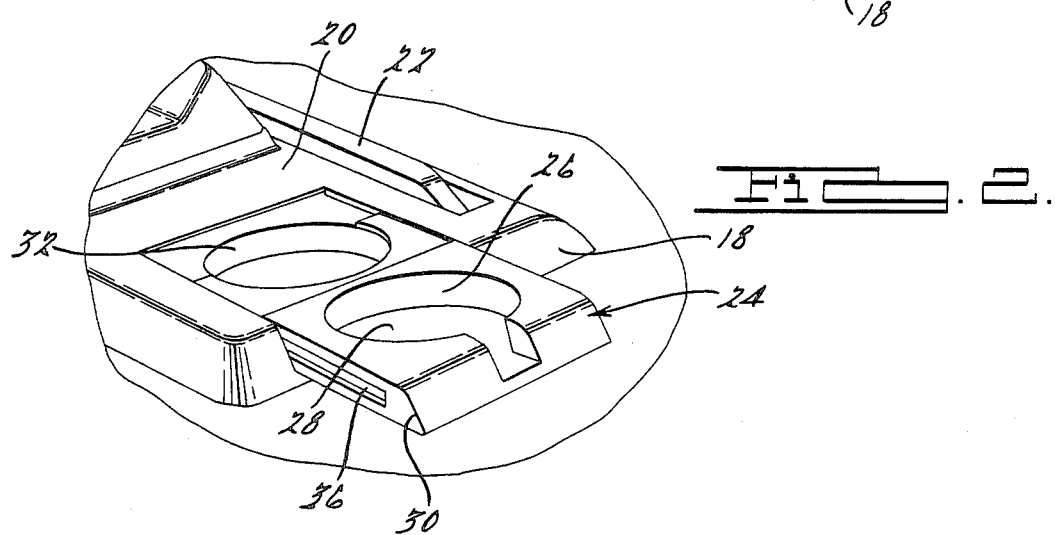
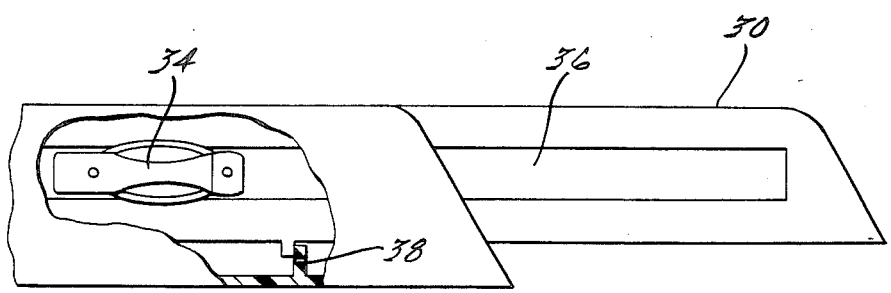

INTEGRATED CONSOLE CUP HOLDER

BACKGROUND OF THE INVENTION

1. Field of the Invention

The field of the invention relates to cup holders which can be formed as an integral component of a vehicle interior console member. Console usage in passenger vehicles is greatly increasing as they provide an excellent device to locate various accessory systems in close proximity to vehicle occupants. One such accessory which has become popular is a beverage bottle or can support which is readily accessible and which will retain the container in a secure fashion to avoid spillage due to vehicle motion. This type of accessory is commonly referred to as a cup holder.

2. Brief Description of the Prior Art

Accessory supports such as cup holders are well known but are presently found in the form of add-on housings as opposed to be an integral part of the vehicle interior. Such presently available devices are bulky and detract from the appearance of the vehicle interior. U.S. Pat. Nos. 3,136,461 and 3,267,567 are representative of such add-on units, and disclose devices which are visually unpleasing and require careful alignment in assembly within the vehicle to insure profit fit. Since they are separate, i.e., not built into the vehicle interior, the devices require individual fasteners, part numbers and strong vehicle support attachment such as floor pan tunnel support.

SUMMARY OF THE INVENTION

An integrated console member is provided having means for supporting one or more containers. The cup holder is constructed to minimize space and weight requirement, present a pleasing "built-in" appearance in contrasr to an "add-on", and yet provide more than adequate means to securely restrain the container from accidental spilage.

The cup holder of this invention is provided by forming a container support recess in a wall of the vehicle console. Advantages of such an integrated console/cup holder structure over separate console and accessory support units include: (1) tight control over alignment and fit of the cup holder in the vehicle; (2) fewer required fasteners and (3) less bulk and aesthetic problems. These advantages combine for lower overall cost, superior product acceptabilty and greater marketability.

BRIEF DESCRIPTION OF THE DRAWINGS

FIG. 1 is a perspective view of a console/cup holder integrated with a vehicle center floor console;

FIG. 2 illustrates the cup holder arrangement shown in FIG. 1 in an open or extended position to provide two cup holders; and FIG. 3 is a side elevation view with a portion of the cup holder housing broken away to show a slide support.

DETAILED DESCRIPTION OF THE INVENTION

The integral console/cup holder assembly of this invention is illustrated in FIG. 1 in an interior center floor passenger car application. The console indicated generally by 10 is shown in conjunction with a conventional floor mounted vehicle transmission lever 12 and transmission control lever index 14.

While the particular shape of the console is not critical to this invention, the console housing will generally have upstanding opposite side walls 16 and at least one end wall 18. It will be understood that an opposite end wall 18 can be omitted if the console is abutted to other interior components. The console housing includes a top wall 20 which may be formed integrally with the opposite side and end walls 16 and 18.

In the illustrated embodiment, the console is designed to rest on the floor of a vehicle having no drive shaft tunnel. As such, the walls of the console housing are low in height, with the top wall 20 connecting with and near the side wall upper edges 22. It will be understood that the console housing could be supported on and about a vehicle drive train tunnel if present.

The cup holder indicated generally at 24 comprises a recess 26 formed in the top wall 20 of the console housing. The recess is appropriately sized and shaped such that the side walls of the recess may snugly embrace the container to be supported. It will be appreciated that the bottom wall 28 of recess 26 could be omitted in instances where the console housing is supported on the vehicle floor such that the container may also rest thereupon.

While FIG. 1 depicts a single cup holder, a second cup holder may be provided by providing a moveable panel 30 in the top wall 20. As shown with reference to FIG. 2, panel 30 may overlie a second recess 32 formed in the console housing top wall 20 that the panel 30 may be moved to give access to the second cup holder. FIG. 3 illustrates a slide attachment of the panel 30 to the console housing walls wherein a guide or tab 34 formed on panel 30 engages with a track 36 located on one of the side walls 16. Travel of the sliding panel is limited by a stop 38.

While the present invention has been described in connection with the preferred embodiment thereof, it should be understood that there may be other embodiments which fall within the spirit and scope of the invention and that the invention is susceptible to modification and variation without departing from the following claims.

What is claimed is:

1. In combination with a motor vehicle of the type including a console housing positioned in the passenger compartment and centrally of the vehicle, an integrated permanently exposed first cup holder formed in said housing and comprising a recess adapted to receive a cup like vessel and be in supporting relationship to the side of the vessel, said console housing including an upstanding end wall and side walls which are interconnected adjacent their upper edge with a generally planar horizontally extending top wall, each of said top wall and end wall having a cutaway section therein, said cutaway sections cooperating to provide an opening capable of receiving a panel member, said panel member being slidably supported on the edge portions of the cutaway section of the horizontally extending top wall whereby the panel is reciprocally slidable with respect to other portions of said console housing, said panel member having a generally flat horizontal surface which is in planar registry with said console top wall and further including an opening defining said first cup holder recess, a second cup holder extending generally parallel with and beneath said horizontally extending console top wall and supported on the edge portions of the cutaway section of the horizontally extending console top wall such that said panel overlies said second cup holder during portions of its reciprocal movement, said second cup holder further including an aperture which defines a cup holder which is accessible during portions of the reciprocal movement of said panel.

* * * * *